(12) United States Patent
Ray et al.

(10) Patent No.: US 7,191,164 B2
(45) Date of Patent: Mar. 13, 2007

(54) SEARCHING FOR OBJECT IMAGES WITH REDUCED COMPUTATION

(75) Inventors: Ajoy K. Ray, Kharagpur (IN); Ranjit K. Mishra, Kharagpur (IN); Tinku Acharya, Chandler, AZ (US)

(73) Assignees: Intel Corporation, Santa Clara, CA (US); Indian Institute of Technology, West Bengal (IN)

( * ) Notice: Subject to any disclaimer, the term of this patent is extended or adjusted under 35 U.S.C. 154(b) by 471 days.

(21) Appl. No.: 10/643,467

(22) Filed: Aug. 19, 2003

(65) Prior Publication Data
US 2005/0044056 A1    Feb. 24, 2005

(51) Int. Cl.
*G06F 9/44* (2006.01)
*G06N 7/02* (2006.01)
*G06N 7/06* (2006.01)

(52) U.S. Cl. ............... 706/52; 706/46; 706/14
(58) Field of Classification Search ......... 706/52, 706/46, 14; 345/355; 382/118
See application file for complete search history.

(56) References Cited

U.S. PATENT DOCUMENTS

| | | | |
|---|---|---|---|
| 5,579,471 A * | 11/1996 | Barber et al. | 715/700 |
| 5,751,286 A * | 5/1998 | Barber et al. | 715/835 |
| 6,121,969 A * | 9/2000 | Jain et al. | 715/850 |
| 6,345,109 B1 | 2/2002 | Souma et al. | 382/118 |
| 6,400,996 B1 * | 6/2002 | Hoffberg et al. | 700/83 |
| 6,418,424 B1 * | 7/2002 | Hoffberg et al. | 706/21 |
| 2004/0024694 A1 * | 2/2004 | Lawrence et al. | 705/38 |

OTHER PUBLICATIONS

U.S. Appl. No. 10/643,672, filed Aug. 19, 2003, Ray et al.
A. W.-C. Fu, P. M. S. Chan, Y.-L. Cheung, and Y. S. Moon. "Dynamic vp-tree indexing for n-nearest neighbor Carch given pair-wise distances". VLDB Journal, 9(2):154-173, Jun. 2000.
Bozkaya, Tolga and Meral Ozsoyoglu. "Indexing Large Metric Spaces for Similarity Search Queries. Associaton for Computing Machinery Transactions on Database System", pp. 1-34, 1999.
C. Xu and J. L. Prince, "Snakes, Shapes, and Gradient Vector Flow," IEEE Trans. Image Proc., pp. 359-369, Mar. 1998.

* cited by examiner

*Primary Examiner*—Joseph P Hirl
(74) *Attorney, Agent, or Firm*—Trop, Pruner & Hu, P.C.

(57) ABSTRACT

In one embodiment, the present invention includes a method to obtain a query image and search a database corresponding to object images for a solution set having a maximum similarity to the query image using fuzzy logic. Also in certain embodiments, based on fuzzy logic, the database may be partitioned into multiple sets based on a fuzzy similarity analysis of a measure of the object images to various thresholds.

17 Claims, 5 Drawing Sheets

SEARCHING FOR OBJECT IMAGES WITH REDUCED COMPUTATION

BACKGROUND

The present invention relates generally to pattern recognition and, more particularly, to searching a database for object images with relatively reduced computational overhead.

Recognition of a human face is one of the most fundamental and seemingly effortless human activities. To impart this capability to a machine has generated a lot of interest in the field of automated face recognition, and a number of implementation approaches have been proposed. The human face recognition is a challenging area of development in biometrics for positive identification of a person. Application of such a machine has a broad utility range varying from photo identification for personal identification, credit card verification, and criminal identification to real time matching of video images in different constraints in terms of processing requirements.

Search mechanisms for images from a huge image database is crucial for success of such a biometric or recognition system. Typical exhaustive search mechanisms are counter-productive for practical applications.

Thus, there is a continuing need for better ways to search an image of an object in a database, especially recognizing similar images with relatively reduced computational overhead.

SUMMARY OF THE INVENTION

In one embodiment of the invention, a method comprises partitioning a database corresponding to object images into a first partition and a second partition based on a fuzzy similarity analysis of a measure of the object images to a first threshold. The method also includes partitioning the first partition and the second partition into at least two portions so that the measure of the object images having a fuzzy similarity more than or equal to a second threshold cluster into a selected one of the at least two portions. In addition, the method may include determining a feature set from image content of a query object image. Furthermore, the method may include, after partitioning the first partition into at least two portions, using fuzzy logic to search the database for at least one image similar to the query object image. The method may also include outputting the image similar to the query object image.

In an alternative embodiment of the invention, the method may comprise partitioning a database corresponding to object images into a plurality of sets based on fuzzy logic. The method may further include obtaining a query image and, after partitioning the database into a plurality of sets, searching the database for a solution set having a maximum similarity to the query image using the fuzzy logic. Finally, the method may include outputting a portion of the solution set.

In another embodiment of the invention, an article may comprise a machine-readable storage medium that contains instructions that when executed, enable a system to partition a database corresponding to object images into a plurality of sets based on fuzzy logic. Further instructions may enable the system to obtain a query image and, after the database is partitioned, search the database for a solution set having a maximum similarity to the query image using the fuzzy logic. Furthermore, the instructions may enable the system to output a portion of the solution set.

In still another embodiment of the invention, a system may comprise a dynamic random access memory containing instructions that when executed, enable the system to partition a database corresponding to object images into a first partition and a second partition based on a fuzzy similarity analysis of a measure of the object images to a first threshold. In addition, the random access memory may contain instructions that, afterwards, enable the system to use fuzzy logic to search the database for at least one image similar to a query object image. Furthermore, the memory may contain instructions to output the image that is similar to the query object. Finally, the system may have a processor coupled to the dynamic random access memory to execute the instructions.

DETAILED DESCRIPTION

In various embodiments, a system may take advantage of explicit information inherently present in both a front and a side view of human face images. Side profile strategy may be used to obtain an outline of the face profile and extract discrete features from it. In such manner, a feature set calculated from the front view may be enriched, providing much richer and explicit information to assist in face recognition.

In certain embodiments, an active contour or snake algorithm (herein a "snake contour", "snakes algorithm", or "snakes") may be used to detect certain boundaries of images. Such active contours may be obtained as discussed in Xu, et al., Snakes, Shapes, and Gradient Vector Flow, IEEE Transactions on Image Processing, pp. 359–369, Vol. 7, No. 3 (March 1998), in one embodiment. In one embodiment, a face boundary may suffice in the case of a side profile. In a front view, the snakes algorithm may be used to detect the face boundary and eye boundaries, eyebrow boundaries, a nose boundary and lip boundary, although the scope of the present invention is not limited in this regard. These snakes are curves defined within an image domain that can move under the influence of internal forces coming from within the curve itself and external forces computed from the image data. These internal and external forces are so defined that snakes may conform to an image boundary or other desired feature within an image. In various embodiments, these forces may be calculated from an energy-based model, and a final curve may evolve from an initial curve under the influence of external potentials while being constrained by internal energies. The initial snakes contour converges iteratively towards the solution of a partial differential equation. In certain embodiments, snakes may be developed around a face image using Gradient Vector Flow (GVF) snake-based contours, as discussed in Xu, et al.

Figure 1:
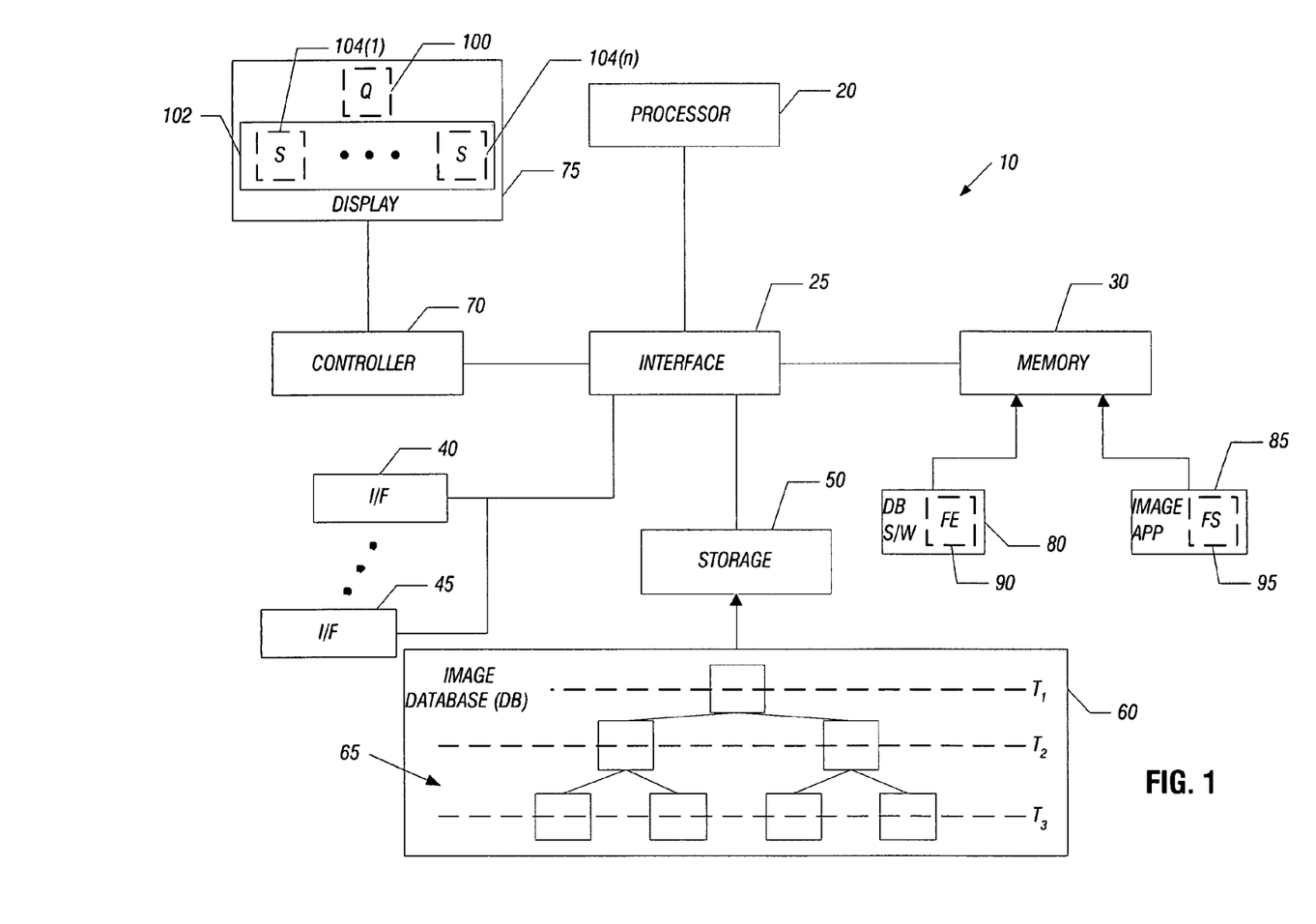
FIG. 1 is a block diagram of a system in accordance with one embodiment of the present invention.

Referring to FIG. 1, a system 10 may include a processor 20 coupled via an interface 25 to a memory 30 storing software 80 and 85 to enable a content-based database search, for example, a fuzzy logic search, of similar images of objects using selected content information according to one embodiment of the present invention. The system 10 may be any processor-based system or device to perform the content-based search. While the system 10 may vary in different embodiments, in one embodiment, system 10 may be a personal computer, notebook computer, a handheld device, or the like. To communicate externally and interactively, the system 10 may include conventional interfaces, including, for example, an interface (I/F) 40 (e.g., a communication interface) and an interface 45 (e.g., a user interface), coupling through the interface 25 to the processor 20.

The interface 25 may couple both the processor 20 and the memory 30 to a storage device 50, storing the images of objects in an image database (DB) 60. For example, the images of objects, such as different views of human faces, may be stored in the image database 60 in the form of a binary tree 65 comprising nodes at different levels (e.g., levels $T_1$, $T_2$, and $T_3$) in a hierarchical manner. Consistent with one embodiment, the software 80 and 85 may index the images of objects as a data structure that enables a content-based search with relatively reduced matching of images in the image database 60. This data structure may be metadata that describes the images in a desired form.

In one embodiment, the tree 65 may provide a distance-based index structure where distance computations between objects of the data domain involve a metric distance function. Using this distance-based index structure, similarity queries may be performed on metric spaces.

By indicating reference data points on the images of objects for the binary tree 65, the software 80 and 85 may partition the data space in the image database 60 into spherical shell-like regions in a hierarchical manner. In this manner, when answering similarity queries, the binary tree 65 may utilize pre-computed distances between reference data points of a query object and reference points at a node at a certain level in the distance-based index structure of the binary tree 65 using fuzzy logic, in one embodiment.

For automated face recognition, a controller 70 may couple to the processor 20 via the interface 25 in accordance with one embodiment of the present invention. The controller 70 may couple to a display 75, showing all the images which may be similar to the given query image in the image database 60. To this end, database software 80 may include a feature extractor 90 to represent images in the image database 60. In certain embodiments, image searching software 85 may include a fuzzy searcher algorithm 95 to partition the representations of images in the image database 60. The image searching application 85 may include a search algorithm capable of searching for images of objects in the image database 60 similar to a query image, using fuzzy logic, in one embodiment.

In operation, approximate matches to a given query object from a collection of images of objects stored in the image database 60 may be located using the distance-based index structure of the binary tree 65. For example, the image database 60 may be queried to find and retrieve an image in the image database 60 that is similar to a query human image with respect to one or more specified criterion. As a result of the content-based search using the distance-based index structure of the binary tree 65, the image searching application 85 may display a query image 100 and a plurality of similar images 102 (including result images 104(1) to 104 ($n$)), forming a solution set in the display 75 according to one embodiment of the present invention. While shown in FIG. 1 as including multiple result images, in other embodiments a single search result may be obtained.

In order to search for similar object images in the image database 60, the binary tree 65 may index the images of objects for similarity search queries. In certain embodiments, binary tree 65 may be indexed using fuzzy logic. Also, instead of comparing all distances (obtained from the images), a selected set of distances may be compared for the selected set of features in the binary tree 65, using a feature vector.

A selected distance function for the selected points may compare a feature vector between the query image and one image of each of a plurality of sets stored in the image database 60, in some embodiments of the present invention. By comparing only a single image from each image set at a feature level using a feature vector comparison, whole image comparisons may be obviated. In this manner, for automatic face recognition, a content-based search in the image database 60 may reduce computational overhead, reducing the content for image matching.

By generating the binary tree 65, the image database 60 may be enabled for image detection indicative of whether a particular person's image may be recognized based on at least two views of the face, in some embodiments of the present invention. Distance values in terms of a distance-to-distance function may be computed from fiducial points to compare a query image of a human face with the images stored in the image database 60.

The binary tree 65 may have a multiplicity of nodes, each of which may include feature sets from a plurality of images, such as images of different individuals. Comparing only a single image from each node using fuzzy logic, the image searching application 85 may perform in a rapid manner using fewer resources, in some embodiments of the present invention. In one embodiment, the image database 60 may include images of human faces being represented by corresponding feature vectors obtained using the feature extractor 90 which may apply the snake algorithm to obtain fiducial point information. The fiducial point information may be used to obtain a feature set of distances normalized and stored in the image database 60, using the binary tree 65 data structure, in various embodiments of the present invention.

A feature vector may include data values for distances between the fiducial points for the image of the human face. In this manner, the image of the human face in the image database 60 having a feature vector may be compared with another image of the human face based on individual fiducial points by comparing the feature vectors completely or in a partial manner, as specified by the search algorithm.

To indicate an exact or approximate match, a distance difference, such as a normalized difference, may indicate a relatively close or no match. For example, if the distance difference between a query image 100 and a database face image is relatively high, a mismatch therebetween may be indicated. However, if the normalized distance difference is relatively small, for example, within a similarity measure, a closer match to the query image 100 may be indicated.

Figure 2:
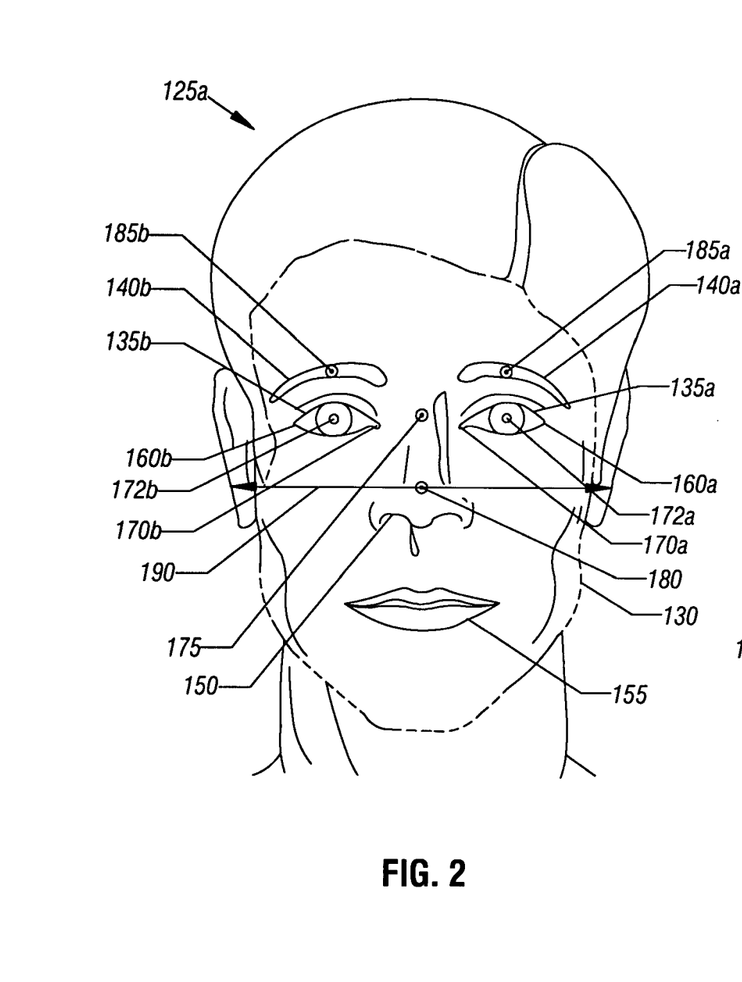
FIG. 2 is a front view of a human face showing fiducial points for indexing an image thereof using contours in accordance with one embodiment of the present invention.

Referring now to FIG. 2, shown is a schematic representation of a front view 125$a$ of a human face showing fiducial points in accordance with one embodiment of the present invention. As shown in FIG. 2, a face boundary 130 (shown in FIG. 2 as a dashed line) may be detected. In one embodiment, the image searching application 85 may use a conventional snake algorithm to detect the face boundary 130, identifying the outline of the face profile in the front view 125a. For example, the snake algorithm may be initialized around the human face and converged using gradient vector flow (GVF) snake-based contours. In addition, other boundaries including eye boundaries 135a, 135b, eye brow boundaries 140a, 140b, nose boundary 150, and lip boundary 155 may also be detected using a snakes algorithm, in one embodiment.

Figure 3:
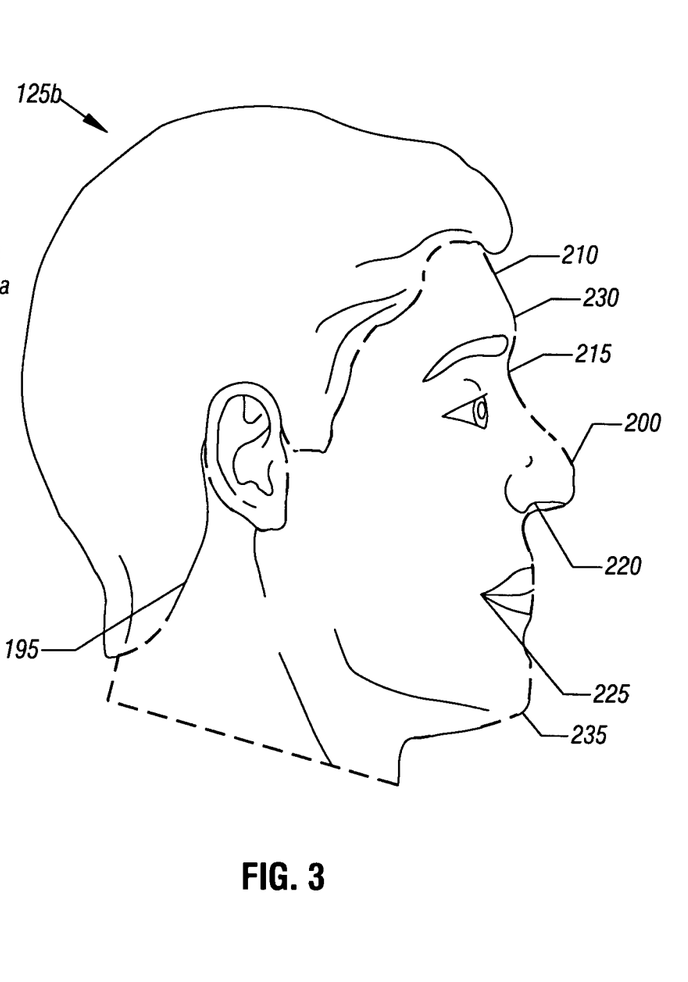
FIG. 3 is a side view of the human face shown in FIG. 2 according to one embodiment of the present invention.

For human face recognition in accordance with one embodiment of the present invention, the image searching application 85 may provide a relatively richer feature set using a face profile of a side view. Referring now to FIG. 3, shown is a side view 125b of the face of FIG. 2. Using side view 125b, a feature set obtained from the front view 125a may be enriched using a feature set having discrete features indicative of the outline of the face profile 195 (shown by the dashed line in FIG. 3) in the side view 125b. In this manner, an enriched feature set based on the properties of image content in both the front and side views 125a, 125b may be generated. While discussed as using front and side views, it is to be understood that other views may be used in other embodiments.

After marking of fiducial points on the front and side views 125a, and 125b, feature vectors may be calculated by measuring pair wise distances between the marked points. For the features in the side view 125b, all distances may be normalized in terms of nose to chin distance, in one embodiment. Likewise, the features extracted in the front view 125a may be normalized in terms of distance between eye centers to nose tip, in one embodiment.

In an embodiment for human face recognition, for marking fiducial points on the front view, a multiplicity of reference points and locations thereof may be found on a face. Namely, inner and outer eye point locations, eye center, nose tip, eye brow point, and face width may be determined in one example embodiment. In such an embodiment, the location of inner and outer eye points may be found from snake contours converging around the two eyes. All the pixel values around each eye location are available. Referring to FIG. 2, for the right eye, the leftmost point 160b gives the outer eye point and the rightmost point 170b gives the inner eye point. The mid-point of these two yields the iris center 172b. Similarly, for the left eye, the rightmost pixel location 160a gives the outer eye point while the leftmost pixel 170a gives the inner eye point. The mid point of these two is the iris center 172a for the left eye.

In one embodiment, the mid point between the two iris centers of the two eyes calculated above gives eye center 175. This point may be identical to the bridge point calculated from the side profile, as will be discussed below. In one embodiment, a snake contour converging on the nose area may yield a set of pixel values from which the nose point, i.e., the tip of the nose can be calculated. The mid point between the two extremes of all the nose points gives the nose tip. As shown in FIG. 2, nose tip 180 may thus be determined. On both the eyebrows a snake contour converges, providing the eye brow point. From all these points, the two extreme points may be chosen, and the mid point of the two extreme points of all the eyebrow points yields the central point 185a, 185b, respectively on the eyebrows. These points are also directly above the iris centers 172a and 172b of the corresponding eyes. In one embodiment, the snakes contour around the whole face may be used to calculate the face width 190 at the nose tip location 180. The leftmost and the rightmost points on the face boundary are noted to calculate the face width at nose tip location.

In an embodiment for human face recognition, in order to mark fiducial points on the side view, a multiplicity of reference points and locations thereof may be found on a face. The multiplicity of reference points and locations may include but are not limited to, a nose point, a chin point, a forehead point, a bridge point, a nose bottom point, a lip bottom point, and a brow point.

In such an embodiment, the nose point may be the rightmost point of the side profile as the protrusion of nose is maximum in any normal human face. For example, referring to FIG. 3, point 200 is the noise point. In case there is more than one such point, the bottommost point may be selected as the nose point. For determining the chin point, lines may be drawn recursively from the nose point to all points below it on the profile and the angle of these lines with the vertical or horizontal is calculated. The point on the lower profile which gives the maximum angle with the horizontal or the minimum angle with the vertical, may be taken as the chin point 235, in one embodiment.

The point on the profile above the nose point whose distance from the nose point is same as the distance between the nose point and chin point may be taken as the forehead point 210, in one embodiment. The bridge point 215 lies on the profile between the nose point 200 and the forehead point 210. The equation of the line joining the forehead point and nose point may be calculated. From this line, perpendiculars may then be drawn to all points on the profile which lie between these two points. The point having maximum perpendicular distance from the line joining the nose point and forehead point is marked as the bridge point. The tangent to the angle between the nose point and all points between nose point and chin point may be calculated. In one embodiment, the point with the minimum angle with the horizontal or maximum angle with the vertical may be marked as nose bottom point 220. Further, the leftmost point between chin point and nose bottom point is marked as the lip bottom point, also known as chin curve point 225. If there are more than one such point in succession, the central point out of these is marked as the lip bottom point. The brow point may be the most raised point between forehead point 210 and bridge point 215. The rightmost point between forehead point and bridge point is marked as brow point 230 in FIG. 3.

In one embodiment, after marking all the points on the front view and side view, feature vectors may be calculated by measuring a distance between two of the marked points. For example, a predetermined feature set of feature vectors may be calculated for each of the side view and front view. In one embodiment, seven features of the front view of the human face image and seven features of the side view of the human face image may be extracted using active contours or snakes. In such an embodiment, a side view may include the following:

1. nose to forehead distance (Dn–fh);
2. nose to bridge distance (Dn–b);
3. nose to nose bottom distance (Dn–nb);
4. brow to bridge distance (Db–b);
5. brow to chin distance (Db–c);
6. nose to chin distance (Dn–c); and
7. nose bottom to lip bottom distance (Dnb–lb).

In such an embodiment, all distances may be normalized. For example, the distances may be normalized in terms of nose to bridge distance, in one embodiment.

In one embodiment, a front view may include the following feature vectors:

1. distance between left and right iris center (Dle–re);
2. distance between two inner eye points (Diep);
3. distance between two outer eye points (Doep);
4. distance between eye center to nose tip (Dec–nt);
5. distance between left iris center and left eyebrow (Dlic–leb);
6. distance between right iris center and right eyebrow (Dric–reb); and
7. face width at nose tip (Dfw).

In such an embodiment, all distances may be normalized. For example, the distances may be normalized in terms of distance between eye center to nose tip, in one embodiment.

Referring now to Tables 1 and 2 below, shown are feature sets for a side view and a front view, respectively, of an example face in accordance with one embodiment of the present invention:

TABLE 1

| Nose to forehead distance | 1.2606 |
|---|---|
| Nose to bridge distance | 1.0000 |
| Nose to nose bottom distance | 0.0942 |
| Brow to bridge distance | 0.3863 |
| Brow to chin distance | 2.0442 |
| Nose to chin distance | 1.2608 |
| Nose bottom to lip bottom distance | 0.6246 |

TABLE 2

| distance between left and right iris center | 1.4654 |
|---|---|
| distance between two inner eye points | 1.0652 |
| distance between two outer eye points | 1.9856 |
| distance between eye center to nose tip | 1.0000 |
| distance between left iris center and left eyebrow | 0.4676 |
| distance between right iris center and right eyebrow | 0.4676 |
| face width at nose tip | 2.7886 |

As shown in Tables 1 and 2, the values may be normalized with respect to nose to bridge distance and eye center to nose tip, respectively. The above feature sets may be used to completely and uniquely represent a pair of images in an image database.

After determining feature sets for front and side views of a face, the feature sets may be stored. For example, in the embodiment of FIG. 1, the feature sets may be stored in a memory such as storage 50. More specifically, in the embodiment of FIG. 1, feature sets may be stored in image database 60 in nodes of binary tree 65 as metadata of the images from which the sets were obtained. In such manner, in certain embodiments, a query image may be searched against similar images in image database 60 in an efficient manner.

Figure 4A:
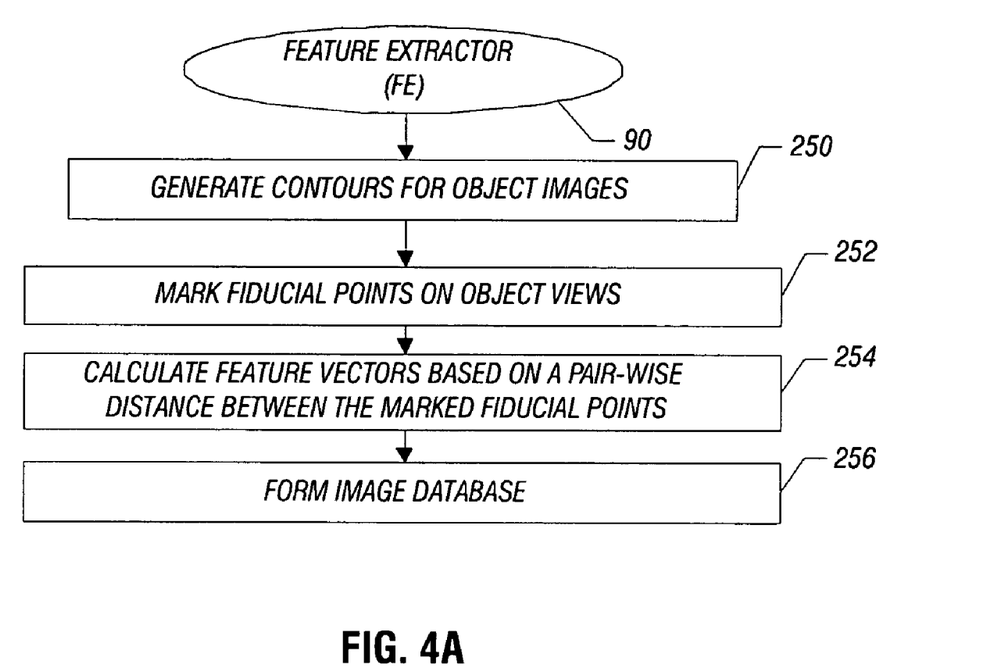
FIG. 4A is a flow diagram of a method in accordance with one embodiment of the present invention.

Referring to FIG. 4A, shown is a flow diagram of a method of extracting feature information in accordance with one embodiment of the present invention. As shown in FIG. 4A, the feature extractor 90 may generate contours for object images to be stored in the image database 60 shown in FIG. 1 (block 250). While the generation of contours may vary in different embodiments, in one embodiment, contours may be generated using a snake algorithm, such as a Gradient Vector Flow (GVF) snake contour. According to one embodiment, the object images may include images of human faces. For example, one or more views, including the front view 125a shown in FIG. 2 and the side view 125b shown in FIG. 3, may be obtained from an individual and used to generate contours about the individual's face. In such an embodiment, contours may be developed around the individual's face boundary, and in certain embodiments, eye boundaries, nose boundary, brow boundaries, and lip boundary. A face boundary may also be generated for the side view.

Next, at block 252, a set of fiducial points may be marked as reference points on the front and side views 125a and 125b, respectively, in accordance with some embodiments. Based on a pair wise distance between the marked fiducial points, the feature extractor 90 may calculate feature vectors for the object views (block 254). In this manner, a database, such as image database 60, may be formed (block 256).

After a desired database is formed, a content-based search thereof may be enabled in different applications that involve image storage and searching, such as for human face recognition in the embodiment of FIG. 1. The image database 60 may be searched for similar images based on the feature sets derived therefrom, stored as feature vectors associated with the object images.

Figure 4B:
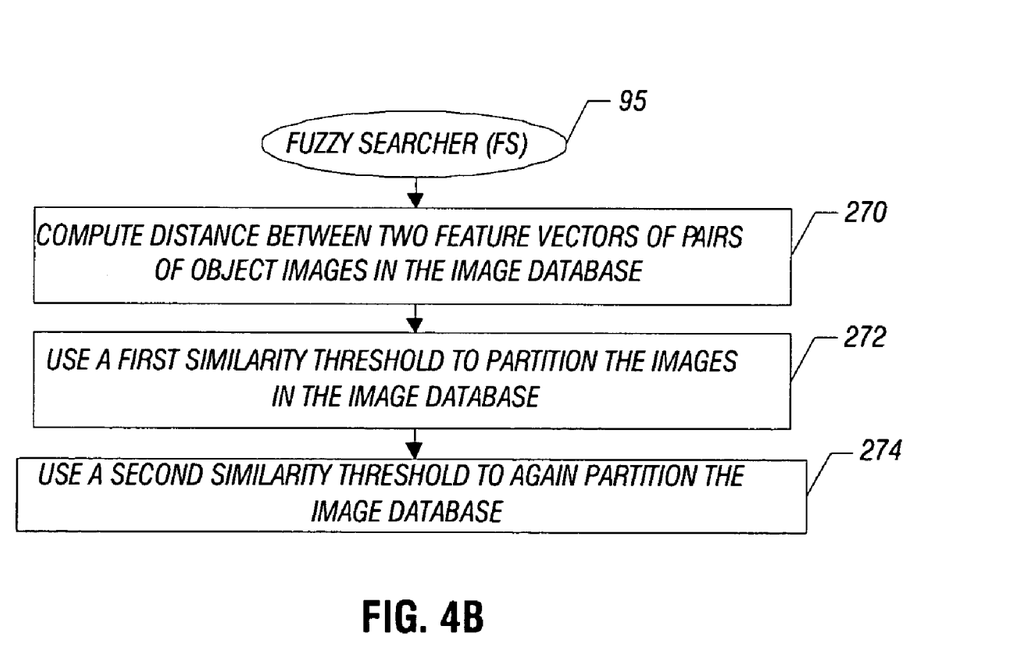
FIG. 4B is a flow diagram of a searching method in accordance with one embodiment of the present invention.

Referring to FIG. 4B, shown is a flow diagram of a fuzzy searching method in accordance with one embodiment of the present invention. As shown in FIG. 4B, fuzzy searcher (FS) 95 may enable searching for similar object images in a database with reduced computation, in some embodiments of the present invention. For example, feature vectors representing images in image database 60 may be searched. To this end, at block 270, distance between two feature vectors of pairs of the object images in the image database 60 may be computed. Using a first similarity threshold, images in image database 60 may be partitioned into dual portions. In such manner, a first portion may include images having a similarity more than or equal to the first similarity threshold. For example, a first similarity threshold may be selected to be 0.5, in one embodiment of the present invention. The two portions may include the object images that partitions the data space into two sets.

In the embodiment of FIG. 4B, a second similarity threshold may again partition the image database 60 into two more different sets of object images (block 274). A set of object images may include similar images, forming a cluster of images that may be treated as a collection of items based on a single image that is indicative of the properties of the content therein.

Figure 5:
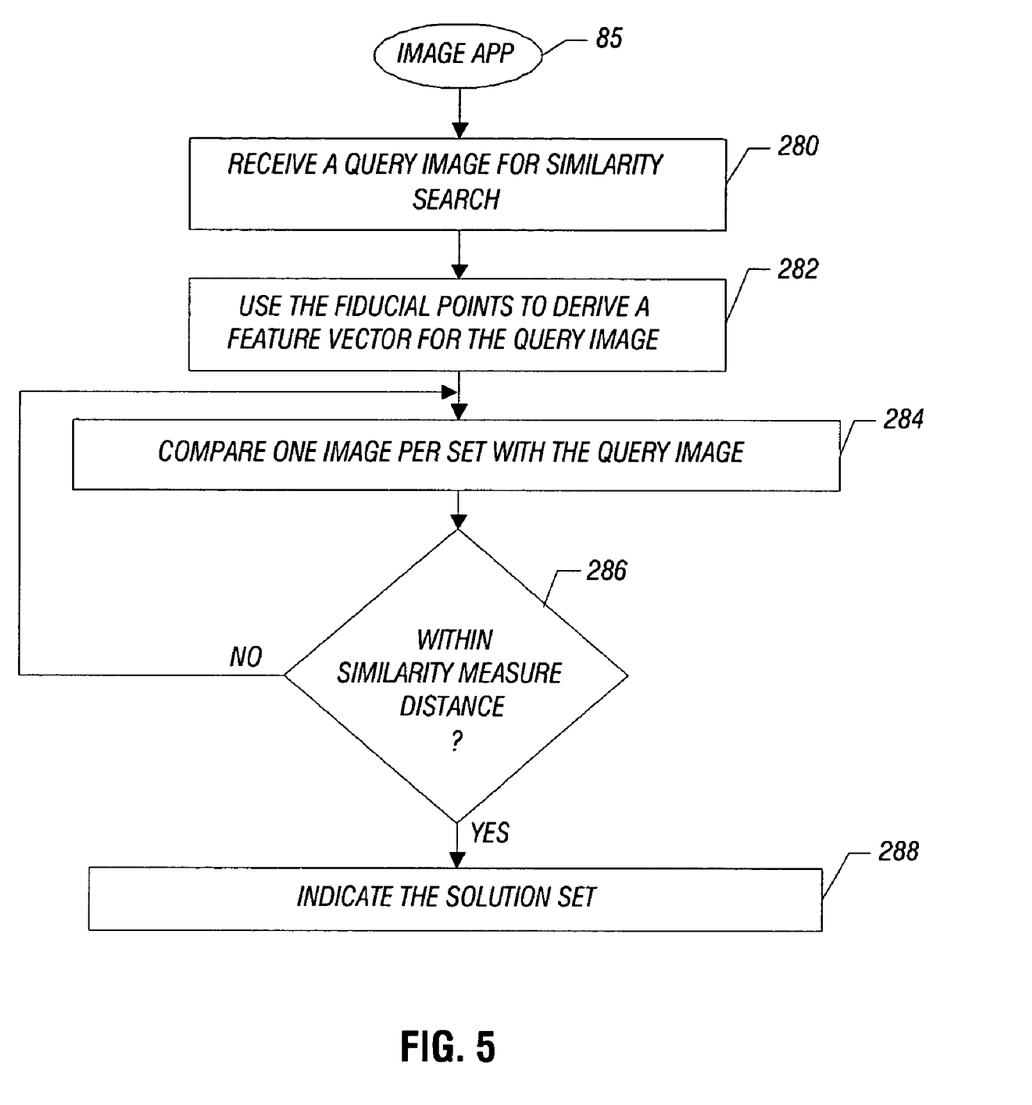
FIG. 5 is a flow diagram of an image searching application for the system shown in FIG. 1 according to one embodiment of the present invention.

Referring to FIG. 5, shown is a flow diagram of a searching algorithm in accordance with one embodiment of the present invention. As shown in FIG. 5, the image searching application 85 may receive a query image for a similarity search, in certain embodiments of the present invention (block 280). Using the fiducial points, a feature vector for the query image may be derived (block 282). For example, the feature vector may be formed as discussed above with regard to the calculation of feature vectors of object images obtained in forming an image database (e.g., block 254 of FIG. 4A).

Then using the feature vector for the query image, a content search for similar images thereto may be enabled. At block 284, instead of comparing with every image in every set, one image per set may be compared with the query image consistent with some embodiments of the present invention.

A check at diamond 286 may determine whether the current comparison provides a maximum similarity measure distance relative to the other sets in the partitioned image database 60. After a set has been compared to the query image, control may pass back to block 284 for a comparison with a next set of the database 60. On comparing the query image with one image of every set, the set which gives maximum similarity with the query image may be indicated to be the solution set (block 288).

According to one embodiment, a search algorithm may use fuzzy logic for human face recognition. In addition to face recognition, such a search algorithm may be used for other database-searching fields such as genetics (e.g., finding approximate DNA or protein sequences in a genetic database), text matching, or time-series analysis, for example.

In one embodiment of the present invention, statistically, a distance between two images may be calculated using the formula:

$$D_p(X, Y) = \left[\sum_{I=1}^{N} (|X_i - Y_i|)^p\right]^{(1/p)} \quad [1]$$

where $D_p$ is the distance between two images with respect to a feature vector, N is the number of images in the database, X and Y are distance coordinates, and in one embodiment, for Euclidean distance computation, a value of p=2 may be selected, as an example.

Consistent with one embodiment, the search algorithm may be a fuzzy logic-based approach, based on fuzzy distance theory. The search algorithm for searching an image database having N images using the fuzzy logic based approach may use a similarity measure to determine a pattern match within a desired threshold.

In accordance with the algorithm, a N×N similarity matrix S representing fuzzy distances may be constructed, where $S(i,j)=[1+distance(i,j)]^{-1}$. Thus each fuzzy membership number in the matrix should be a fractional number representing a fuzzy distance. Then, the fuzzy transitivity of the matrix may be checked. If such transitivity does not exist, S may be replaced by S U $S^2$, where U ... $S^{N-1}$.

After construction of the similarity matrix and checking for fuzzy transitivity thereof, the matrix may be used to partition the image database 60 into different portions or sets. In such manner, fuzzy searching of the image database 60 may be enabled, allowing query image searching to be performed based on fuzzy parameters, i.e., fuzzy distances.

In one embodiment, a first threshold may be selected and used to partition the image database 60 into two parts such that images having a similarity more than or equal to the first threshold are present in a first portion, and those less than the first threshold present in a second portion. In one such embodiment, the first threshold may be selected as 0.5. Given the desirability of partitioning a database into a plurality of different portions or sets so that a fuzzy search may be performed of the database in a computationally efficient manner and also provide for search results that approximate a query image, the database may be partitioned additional times. For example, the two partitions of the database may in turn be partitioned using additional thresholds, e.g., a second, third, and fourth threshold. In one embodiment, a second threshold may be 0.75, a third threshold 0.80, and fourth threshold 0.90. By partitioning a database in accordance with this embodiment of the present invention, the database may be partitioned into 16 sets, for example.

Then, when a query image is provided and processed (as discussed above with regard to FIG. 5), the resulting feature vector may be compared with one image of every set in the image database 60, and the set which gives maximum similarity with the query image may be taken as the solution set.

Figure 6:
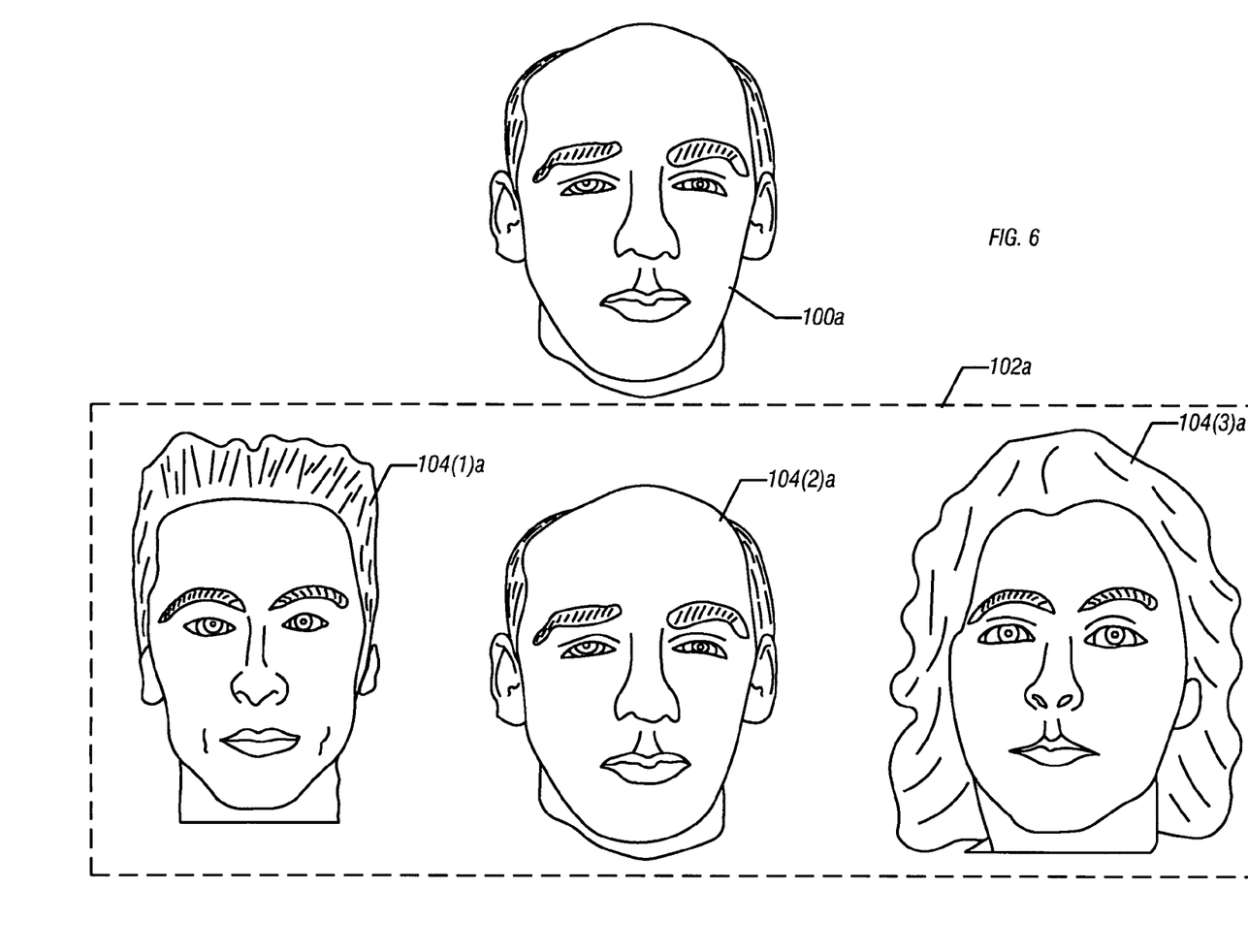
FIG. 6 is a schematic depiction of a query image and search results from the image database shown in FIG. 1 consistent with one embodiment of the present invention.

Referring now to FIG. 6, shown is a schematic depiction of a query image 100a in accordance with one embodiment of the present invention. As shown in FIG. 6, query image 100a may be used to query an image database 60. Further shown is a solution set 102a, which includes the results of the query, and has therein a first search result 104(1)a, a second search result 104(2)a, and a third search result 104(3)a. Additional fuzzy logic processing may be used to select from among the images of the solution set the closest match or matches, in certain embodiments. In such manner, a first, second, and third choice for a corresponding match of a face image may be determined, with fuzzy distance theory determining first, second, and third choices, as in the embodiment of FIG. 6.

Embodiments of the present invention may be implemented in code and may be stored on a storage medium having stored thereon instructions which can be used to program a system, such as system 10 to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, or any type of media suitable for storing electronic instructions, including programmable storage devices.

While the number of features to be extracted from contours of images may vary, in certain embodiments, less than ten such features may be extracted from a front image, and similarly less than ten features may be extracted from a side image. In such manner, in certain embodiments computational requirements may be lessened and analysis may be performed more rapidly. Accordingly, in certain embodiments, facial recognition may be performed using lower power devices, such as handheld devices or other such systems. In one such embodiment, an identification system may be used to perform biometric analysis for identification of individuals seeking access to a secure environment, for example. In such a system, a video capture device may be used to obtain front and side images of an individual and process those images in a system. If positive identification of the individual is achieved, the individual may be given access to the secure environment.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   partitioning a database corresponding to object images into a first partition and a second partition based on a fuzzy similarity analysis of a measure of the object images to a first threshold;
   partitioning each of the first partition and the second partition into at least two portions so that the measure of the object images having a fuzzy similarity more than or equal to a second threshold cluster into a selected one of the at least two portions;
   determining a feature set from image content of a query object image;

after partitioning the first partition into the at least two portions. using fuzzy logic to search the database for at least one image similar to the query object image; and outputting the at least one image similar to the query object image.

2. The method of claim 1 further comprising:

deriving the feature set for each of the object images from contours of at least two views of objects corresponding to each of the object images.

3. The method of claim 1, wherein using the fuzzy logic comprises comparing one object image from each of said first and second partitions with said query object image.

4. The method of claim 3, further comprising:

based on the comparison, obtaining the at least one similar image as a match in the partition that indicates maximum similarity with said query object image.

5. The method of claim 1, further comprising:

forming a similarity matrix for the object images within the database before partitioning the database.

6. A method comprising:

partitioning a database corresponding to object images into a plurality of sets based on fuzzy logic;

obtaining a query image;

after partitioning the database into the plurality of sets, searching the database for a solution set having a maximum similarity to the query image using fuzzy logic, and outputting at least a portion of the solution set.

7. The method of claim 6, wherein searching the database comprises comparing a single image of each of a plurality of sets within the database to the query image.

8. The method of claim 7, wherein comparing the single image comprises comparing a feature vector of the query image to a corresponding feature vector of the single image.

9. The method of claim 6, further comprising partitioning the database into a plurality of levels, each of the levels corresponding to a similarity threshold.

10. The method of claim 6, wherein outputting a portion of the solution set comprises displaying at least one object image corresponding to the portion of the solution set.

11. An article comprising a machine-readable storage medium containing instructions that if executed enable a system to:

partition a database corresponding to object images into a plurality of sets based on fuzzy logic;

obtain a query image;

after the database is partitioned, search the database for a solution set having a maximum similarity to the query image using the fuzzy logic; and output at least a portion of the solution set.

12. The article of claim 11, further comprising instructions that if executed enable the system to compare a single image of each of a plurality of sets within the database to the query image.

13. The article of claim 12, further comprising instructions that if executed enable the system to compare a feature vector of the query image to a corresponding feature vector of the single image.

14. A system comprising:

a dynamic random access memory containing instructions that when executed enable the system to partition a database corresponding to object images into a first partition and a second partition based on a fuzzy similarity analysis of a measure of the object images to a first threshold; to thereafter use fuzzy logic to search the database for at least one image similar to a query object image; and to output the at least one image similar to query object image; and a processor coupled to the dynamic random access memory to execute the instructions.

15. The system of claim 14, further comprising instructions that when executed enable the system to derive a feature set for each of the object images from contours of at least two views of objects corresponding to each of the object images.

16. The system of claim 14, further comprising instructions that when executed enable the system to obtain the at least one similar image as a match in the partition that indicates maximum similarity with said query object image.

17. The system of claim 16, further comprising a display coupled to the processor to display the query object image and the at least one similar image.

* * * * *